United States Patent
Ruehrnoessl et al.

(10) Patent No.: US 9,545,683 B2
(45) Date of Patent: Jan. 17, 2017

(54) METHOD FOR PERFORMING A WELDING PROCESS, WELDING DEVICE AND WIRE COIL FOR SUCH A WELDING DEVICE

(71) Applicant: Fronius International GmbH, Pettenbach (AT)

(72) Inventors: Manfred Ruehrnoessl, Linz (AT); Markus Schorn, Steinerkirchen (AT); Herbert Staufer, Neuhofen an der Krems (AT)

(73) Assignee: Fronius International GmbH, Pettenbach (AT)

( * ) Notice: Subject to any disclaimer, the term of this patent is extended or adjusted under 35 U.S.C. 154(b) by 222 days.

(21) Appl. No.: 14/483,320

(22) Filed: Sep. 11, 2014

(65) Prior Publication Data

US 2015/0069031 A1    Mar. 12, 2015

(30) Foreign Application Priority Data

Sep. 12, 2013   (AT) .............................. A 50576/2013

(51) Int. Cl.

| | |
|---|---|
| *B23K 9/10* | (2006.01) |
| *B23K 35/22* | (2006.01) |
| *B23K 9/12* | (2006.01) |
| *B23K 9/095* | (2006.01) |
| *B23K 9/26* | (2006.01) |

(52) U.S. Cl.
CPC ............. *B23K 9/121* (2013.01); *B23K 9/0956* (2013.01); *B23K 9/125* (2013.01); *B23K 9/26* (2013.01)

(58) Field of Classification Search
CPC .................... B23K 9/0956; B23K 9/12–9/125; B23K 9/26
USPC ............................... 219/130.21, 136, 137 R, 137.2,219/145.1–145.41, 146.1–146.52
See application file for complete search history.

(56) References Cited

U.S. PATENT DOCUMENTS

| | | | |
|---|---|---|---|
| 6,708,877 B2* | 3/2004 | Blankenship ........ | B23K 9/1062 219/54 |
| 2014/0151350 A1* | 6/2014 | Hemmert ............. | B23K 9/0956 219/137.7 |

FOREIGN PATENT DOCUMENTS

| | | |
|---|---|---|
| CA | 1022627 A1 | 12/1977 |
| GB | 233199 A | 5/1925 |
| JP | H03294097 A | 12/1991 |

OTHER PUBLICATIONS

Austrian Office Action in A 50576/2013, with English translation of relevant parts.

* cited by examiner

*Primary Examiner* — Sang Y Paik
(74) *Attorney, Agent, or Firm* — Collard & Roe, P.C.

(57) ABSTRACT

A method and a welding device for performing a welding process on a workpiece by a welding torch, uses a melting welding wire, which is arranged on a wire coil and may be supplied to the welding torch via a hose package, wherein different welding wires and different welding parameters are used depending on the geometry of the workpiece. A welding wire formed by the different interconnected welding wires in lengths depending on the geometry of the workpiece is arranged on the wire coil, so the welding process may be performed without interruptions using the different welding wires and the different welding parameters by supplying to the welding torch the welding wire formed by the different interconnected welding wires from the wire coil.

17 Claims, 3 Drawing Sheets

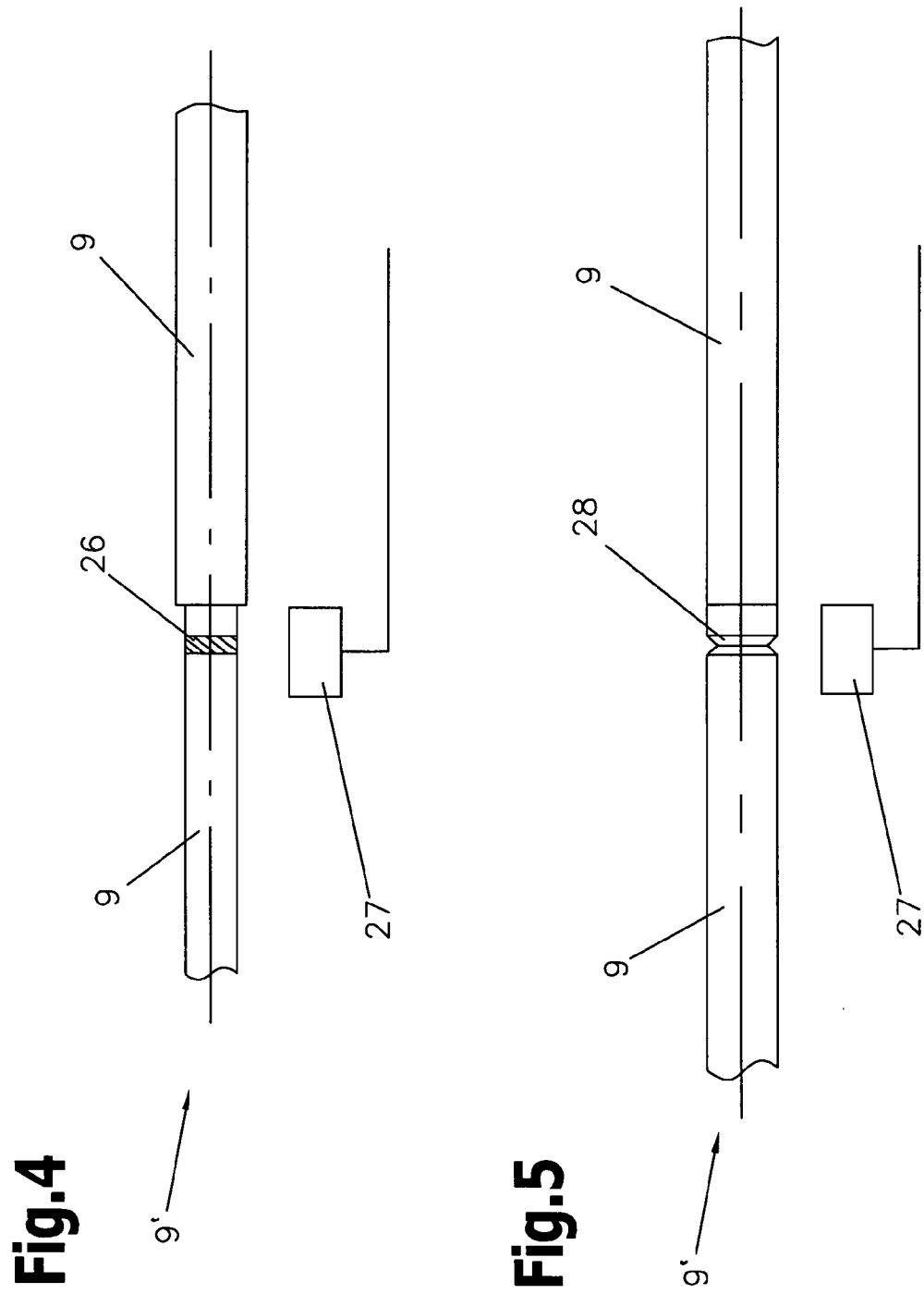

METHOD FOR PERFORMING A WELDING PROCESS, WELDING DEVICE AND WIRE COIL FOR SUCH A WELDING DEVICE

CROSS REFERENCE TO RELATED APPLICATIONS

Applicant claims priority under 35 U.S.C. §119 of Austrian Application No. A 50576/2013 filed Sep. 12, 2013, the disclosure of which is incorporated by reference.

BACKGROUND OF THE INVENTION

1. Field of the Invention

The invention relates to a method for performing a welding process on a workpiece by a welding torch, using a melting welding wire, which is supplied to the welding torch from a wire coil, wherein different welding wires and different welding parameters are used depending on the geometry of the workpiece.

The invention further relates to a welding device for performing a welding process on a workpiece by a welding torch, using a melting welding wire, which is arranged on a wire coil and may be supplied to the welding torch via a hose package, wherein different welding wires and different welding parameters are used depending on the geometry of the workpiece.

Finally, the invention also relates to a wire coil with a welding wire for performing a welding process using a welding device as mentioned above.

2. Description of the Related Art

Methods for connecting welding wires are known from the prior art, all of which include connecting a single welding wire in order to allow an uninterrupted welding of a workpiece using a single welding wire. Methods for connecting a welding wire are shown in CA 1022627 A1, GB 233199 A and JP H03294097 A, for example.

During the welding of some workpieces, the welding process needs to be performed with different welding wires and different welding parameters depending on the geometry of the workpiece in order to obtain certain properties. Regarding rails, for example, the region of the rail base is welded with different welding materials and different welding parameters than the region of the rail head. According to the prior art, the welding process is started with one welding wire, then it is interrupted, the welding wire is changed, and the welding process is continued on the workpiece with the new welding wire. Due to the interruption of the welding process, the welding quality is compromised. In order to keep the break between the welding processes short, multiple welding devices with the different welding wires may be used, but this makes the welding process more complicated.

SUMMARY OF THE INVENTION

It is thus the object of the present invention to create a welding process, welding device and wire coil as mentioned above, which make it possible to perform a welding process on a workpiece using different welding wires and different welding parameters depending on the geometry of the workpiece. The welding quality should be as high as possible, and the performing of the welding process should require as little work and as low costs as possible.

Regarding the method, the object according to the invention is achieved by performing the welding process without interruptions using the different welding wires and the different welding parameters by supplying to the welding torch a welding wire formed by the different interconnected welding wires in lengths depending on the geometry of the workpiece from the wire coil. This means that the invention includes considering experienced data for welding workpieces using different materials and parameters, and pre-assembling and interconnecting the different welding wires in corresponding lengths based on these experienced data in order to form a common welding wire, which is supplied to the welding torch from the wire coil. According to this, wire coils with certain compositions of welding wires are pre-manufactured for welding certain workpieces, so the different interconnected welding wires forming the welding wire and the corresponding welding parameters may be used automatically during the welding process. In this way, an uninterrupted welding process having an ideal effect on the welding quality and the duration of the welding is possible even when welding workpieces with different materials. For example, the wire coil with a welding wire consisting of two different interconnected welding wires allows welding a rail in one welding process, wherein the rail base is welded with a different welding wire and different welding parameters than the rail head in order to obtain the required properties of the workpiece. The only prerequisite for performing the welding method is the correct direction of the welding process. Since in a plurality of workpieces that require welding with different welding materials the transition from one region to another does not need to be exact, a certain tolerance for the transition from one welding wire to another welding wire connected thereto is acceptable as well. In an automatic robot-controlled welding method, however, the transition from one welding wire to the other welding wire connected thereto may be set very accurately as well.

Advantageously, a change of the different interconnected welding wires forming the welding wire is detected during supply of the welding wire. In this way, the change of the different interconnected welding wires forming the welding wire may be communicated to the welder and/or the welding device, and possible required measures such as initiating the switching of welding parameters may be taken. The detection may be of various types.

When indicating the change of the different interconnected welding wires forming the welding wire, a corresponding feedback may be provided to the welder. The display may be visual and/or audible as well as mechanical, for example by vibration of the welding torch.

The change of the different interconnected welding wires forming the welding wire may be detected by an indicator arranged in a region of the transition from one welding wire to the other welding wire connected thereto. This indicator, which may be formed by a ring made of a material different from the interconnected welding wires, for example, is fastened in the region of the transition from one welding wire to the other welding wire connected thereto during assembly of the welding wire, and detected by an appropriate detector. Indicators made of an optically detectable material or a magnetically detectable material may be contemplated, for example.

Alternatively, the change of the interconnected welding wires forming the welding wire may also be detected indirectly via the welding parameters. Due to the fact that the parameters of the electric arc, mainly the arc voltage and the arc current, change within a certain range when changing the different interconnected welding wires forming the welding wire, the change of the interconnected welding wires may also be detectable via the parameters of the arc. The advantage here is that the interconnected welding wires need not be marked or provided with indicators in the region of the transition.

Preferably, the welding parameters are changed automatically when a change of the interconnected welding wires forming the welding wire is detected. This guarantees an uninterrupted welding process and thus a high welding quality.

According to a further feature of the invention, information about each welding wire on the wire coil may be communicated from an information carrier arranged on the wire coil to a control device of the welding device. In this way, the change from one welding wire to the other welding wire of the wire coil may be determined from the information received without indicators present on the welding wire, and a preferably automatic change of the welding parameters may be performed when changing the welding wire.

The object according to the invention is also achieved by a welding device as mentioned above, wherein a welding wire formed by the different interconnected welding wires in lengths depending on the geometry of the workpiece is arranged on the wire coil, so the welding process may be performed without interruptions using the different welding wires and different welding parameters, since the welding wire formed by the different interconnected welding wires may be supplied to the welding torch from the wire coil. Such a welding device requires no or hardly any changes with respect to conventional welding devices, so widespread use can be guaranteed. Regarding the advantages obtainable thereby, reference is made to the above description of the method.

If an indicator is arranged in the region of the transition of the interconnected welding wires forming the welding wire, the transition from one welding wire to another welding wire connected thereto may be reliably detected by a detector and communicated to other components of the welding device.

Advantageously, a detector for detecting the change of the interconnected welding wires forming the welding wire is provided. By means of an appropriate detector, which may be arranged at a suitable location of the welding device such as the region of the feed device or the welding torch, the corresponding indicator in the region of the transition from one welding wire to the other welding wire connected thereto is detected, and appropriate steps may be communicated to the welder, for example the display of a change of the interconnected welding wires forming the welding wire.

This detector may be formed by an optical detector. For example, the indicator may be formed by a ring made of a reflecting material and the optical detector may be formed by a reflection light barrier which detects the indicator in an appropriate manner.

Alternatively, the detector may also be formed by a magnetic detector. In this case, the indicator may be formed by a ring made of a magnetic material, which may be detected by this magnetic detector. Other indicators, however, such as notches in the region of the transition from one welding wire to the other welding wire connected thereto, which may be detected by corresponding detectors, are possible as well.

However, the detector may also be formed by a device for detecting the parameters of the electric arc, so the change of the interconnected welding wires is detected indirectly. When using this type of detection, which may be implemented by software in the control device of the welding device, for example, no measures on the wire coil and/or the welding wire are required.

A reader for reading an information carrier arranged on the wire coil, containing information about each welding wire on the wire coil, may be provided in the welding device. Preferably, the reader is connected to the control device of the welding device, so it may initiate changes, for example on the welding parameters, according to the information received.

The object according to the invention is also achieved by a wire coil as mentioned above, wherein the welding wire is formed by different interconnected welding wires the lengths of which depend on the geometry of the workpiece to be welded. Regarding the advantages obtainable thereby, reference is made to the above description of the welding method and the welding device.

Preferably, the different interconnected welding wires forming the welding wire are welded together on the wire coil. This ensures a fast and secure interconnection of the different welding wires forming the welding wire.

In the region of the transition from one welding wire forming the welding wire to the other welding wire connected thereto, an appropriate indicator to be detected by a corresponding detector may be arranged.

The indicator may be formed by a ring around one of the welding wires forming the welding wire, made of a different material than the welding wires.

The indicator may also be formed by a mark on one of the welding wires forming the welding wire, which may be put into practice by means of a coloured ring or a notch.

Preferably, the different interconnected welding wires forming the welding wire on the wire coil include different materials and/or different diameters. In this way, various properties may be obtained depending on the geometry of the material, such as a softer composition in the region of the base of a rail and a harder composition in the head of a rail.

As has already been mentioned above, an information carrier containing information about each welding wire may be arranged on the wire coil, and may be formed by a label, a bar code, a QR code, an RFID tag or the like.

BRIEF DESCRIPTION OF THE DRAWINGS

The present invention is discussed in more detail by means of the attached schematic drawings, in which:

FIG. 4 shows an indicator in the region of the transition from one welding wire to another welding wire; and FIG. 5 shows a mark in the region of the transition from one welding wire to another welding wire.

DETAILED DESCRIPTION OF PREFERRED EMBODIMENTS

Figure 1:
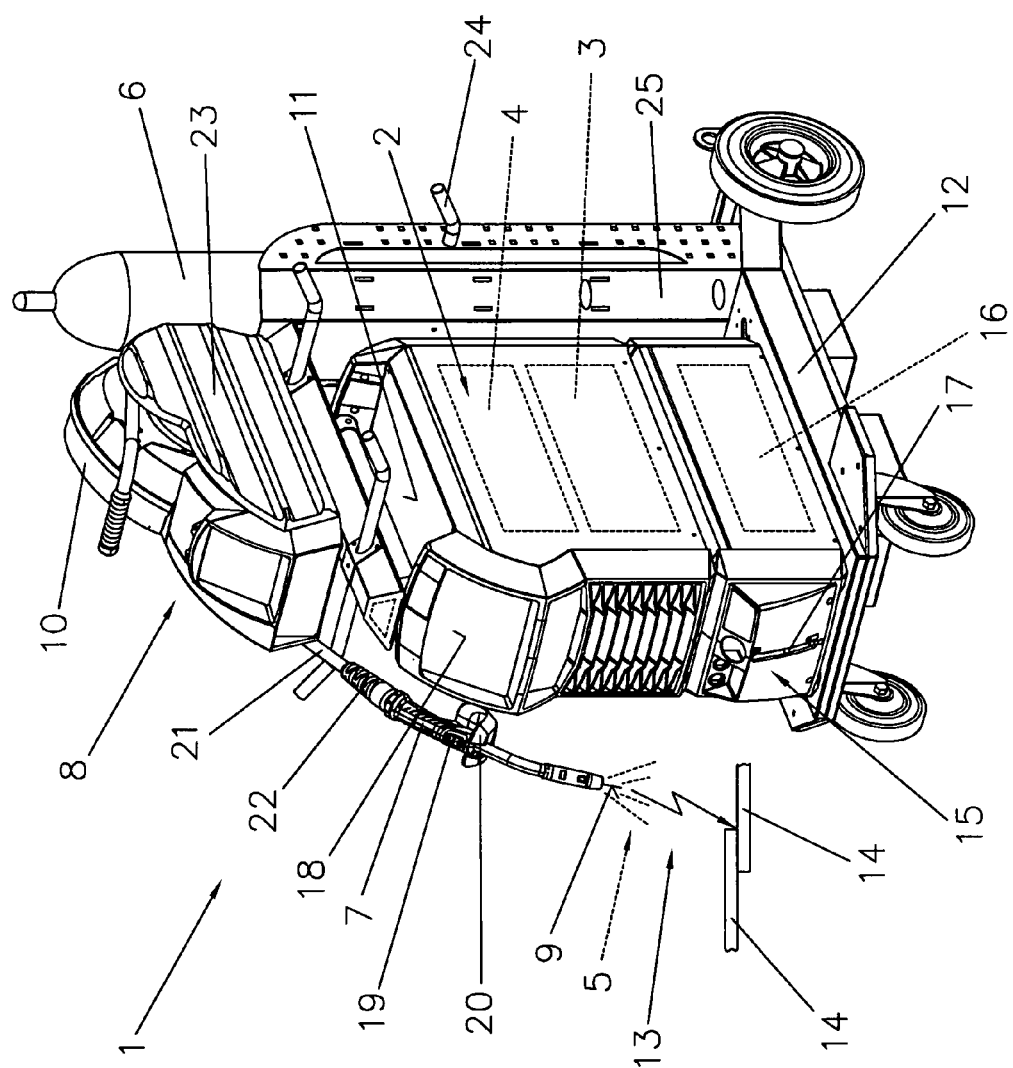
FIG. 1 shows a design of a welding device.

FIG. 1 shows a welding device 1 for many different processes and/or methods such as MIG/MAG, TIG, electrode, doublewire/tandem welding operations, plasma operations or brazing and soldering operations etc.

The welding device 1 comprises a power source 2 with a power unit 3 arranged therein, a control device 4 and further components and wires (not shown) such as a switching member, control valves etc. The control device 4 may be connected to a control valve that is arranged in a supply line for a shielding gas 5 between a gas storage 6 and a welding torch 7.

In addition, the control unit 4 may be used to control a device 8 for conveying a welding wire 9 from a wire coil 10 to the region of the welding torch 7, as it is common for MIG/MAG welding. Of course it is possible for the wire feed device 8 to be integrated into the welding device 1, in particular into the housing 11 of the power source 2, instead of being an additional device placed on a cart 12, as illustrated in FIG. 1. It is also possible for the feed device 8 for the welding wire 9 to be placed directly on top of the welding device 1, with the housing 11 of the power source 2 being formed on the top surface for receiving the feed device 8, and the cart 12 can be omitted.

Furthermore, it is possible for a conveying device 8 to supply the welding wire 9 outside of the welding torch 7 to the process site, in which case a non-melting electrode is preferably arranged within the welding torch 7, as is common in TIG welding.

The current for creating an electric arc 13 between the welding wire 9 and a workpiece 14, which is formed from one or multiple parts, is supplied to the welding torch 7 by the power unit 3 of the power source 2 via a welding line (not shown). The workpiece 14 to be welded is connected to the power source 2 via a further welding line (not shown) for the further potential, in particular an earth cable, so that an electric circuit for a process can be created by means of the arc 13.

For cooling the welding torch 7, it may be connected to a liquid tank, in particular a water tank 16 with a level indicator 17, via a cooling device 15 and possible intermediate components such as a flow controller. On start-up of the welding torch 7, the cooling device 15, in particular a liquid pump used for the liquid placed in the water tank 16, is started, thus cooling the welding torch 7. As is shown in the exemplary embodiment given, the cooling device 15 is placed on the cart 12 before placing the power source 2 thereon. The individual components of the welding device 1, i.e. the power source 2, the wire feeding device 8 and the cooling device 15, are formed in such a way that they have corresponding protrusions and/or recesses so they can be stacked or placed on top of each other safely.

The welding device 1, the power source 2 in particular, further comprises an input and/or output device 18 for setting and/or retrieving and displaying all the various welding parameters, operation modes or welding programs. The welding parameters, operation modes or welding programs that have been set by the input and/or output device 18 are communicated to the control device 4, which then actuates the individual components of the welding device 1 and/or defines appropriate set points for regulating or controlling. It is also possible to perform setting procedures via the welding torch 7 when using an appropriate welding torch 7, in which case the welding torch 7 is equipped with a welding torch input and/or output device 19. In this case, the welding torch 7 is preferably connected to the welding device 1, in particular the power source 2 or the feed device 8, via a data bus, in particular a serial data bus. For starting the welding process, the welding torch 7 usually comprises a starting switch (not shown), so the arc 13 can be ignited by actuating the starting switch. In order to protect the user from the heat radiation of the arc 13, the welding torch 7 may be equipped with a heat protection shield 20.

In the exemplary embodiment shown, the welding torch 7 is connected to the welding device 1 via a hose package 21, said hose package 21 being fastened to the welding torch 7 by an anti-buckling means 22. In the hose package 21, the individual lines such as the supply line, lines for the welding wire 9, for the shielding gas 5, for the cooling circuit, for data transmission etc. are arranged from the welding device 1 to the welding torch 7 while the earth cable is preferably connected separately to the power source 2. Preferably, the hose package 21 is connected to the power source 2 or the feed device 8 by means of a coupling device not shown, whereas the individual lines in the hose package 21 are attached to or in the welding torch 7 by an anti-buckling means. In order to guarantee an appropriate strain relief for the hose package 21, the hose package 21 may be connected to the housing 11 of the power source 2 or the feed device 8 via a strain relief device (not shown).

In general, not all components mentioned above have to be used and/or incorporated for the different welding operations and/or welding devices 1. It may be possible for the welding torch 7 to be formed as an air-cooled welding torch 7 so the cooling device 15 can be omitted. The welding device 1 is formed by at least the power source 2, the feed device 8 and the cooling device 15, if required, which components may all be arranged within a common housing 11. It is possible to arrange further parts and/or components such as a drag protection 23 on the wire feeding device 8 or a carrier 24 for optional equipment on a holder 25 for the gas storage 6 etc.

The embodiment of a welding device 1 illustrated in FIG. 1 represents only one of many possibilities. Welding devices 1 may vary, in particular, regarding supply of the welding wire 9, length of the hose package 21, type, position and number of feed devices 8 for the welding wire 9, presence of a wire buffer (not illustrated) and many more.

Figure 2:
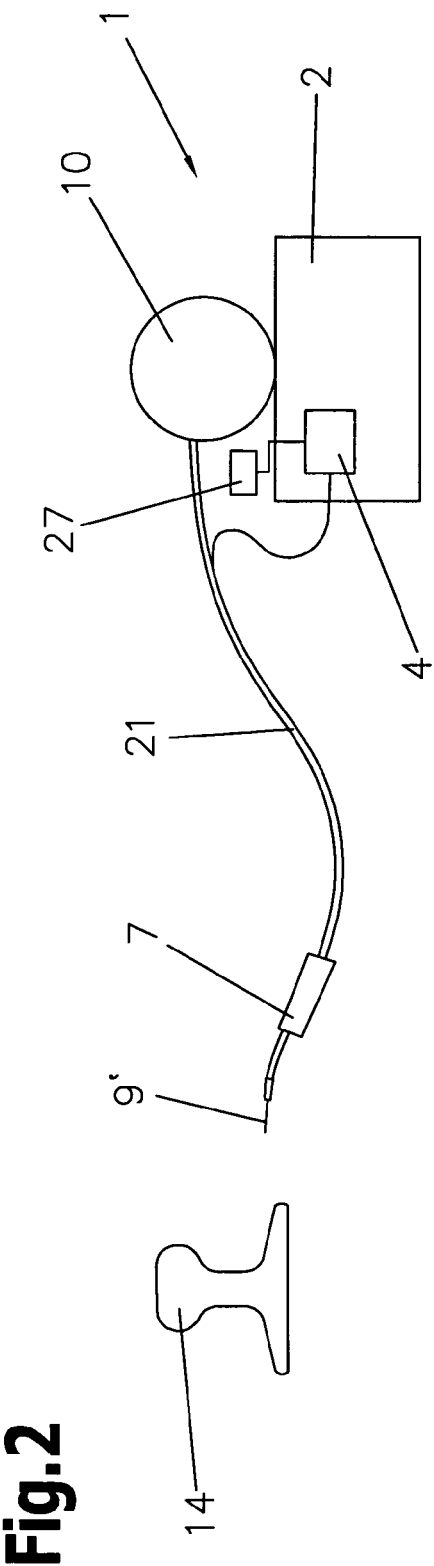
FIG. 2 shows a schematic illustration of a welding device for welding a workpiece using different welding wires and different welding parameters depending on the geometry of the workpiece.

FIG. 2 shows a schematic illustration of a welding device 1 for welding a workpiece 14 using a welding wire 9' that is formed by different interconnected welding wires 9 in corresponding lengths $L_i$ depending on the geometry of the workpiece 14 and using different welding parameters $P_i$. As an example for a workpiece 14, the cross-section of a rail is illustrated, which is to be welded with a different welding wire 9 and different rail parameters $P_i$ in the region of the rail base and in the region of the wire head. According to this, the welding process is started in the region of the rail base, and the welding wire 9', which consists of the different interconnected welding wires 9, is supplied to the welding torch 7 from a wire coil 10. In the region of the rail head, a different welding wire 9 is automatically supplied to the welding torch 7, and the welding parameters $P_i$ are adjusted where applicable, so a different composition of the workpiece may be obtained in the region of the rail head. By means of a detector 27, the change from one welding wire 9 forming the welding wire 9' to the other welding wire 9 connected thereto may be detected and communicated to the control device 4 of the welding device 1 and/or the power source 2. When detecting the change of the welding wires 9 forming the welding wire 9', which may also be done indirectly by changing the welding parameters $P_i$, the change is indicated to the welder, for example audibly or visually, so he is informed about the change.

Information about each welding wire 9 arranged on the wire coil 10 may also be contained on an information carrier 28, which is arranged on the wire coil 10. This information carrier 28 may be formed by a label, a bar code, a QR code, an RFID (radio frequency identification) tag or the like and may contain information about the length $L_i$, the material and the diameter of each welding wire 9' on the wire coil 10. By means of an appropriate reader 29, such as a camera or an RFID transponder, the corresponding information may be read and supplied to the control device 4 of the welding device 1 and/or the power source 2.

Figure 3:
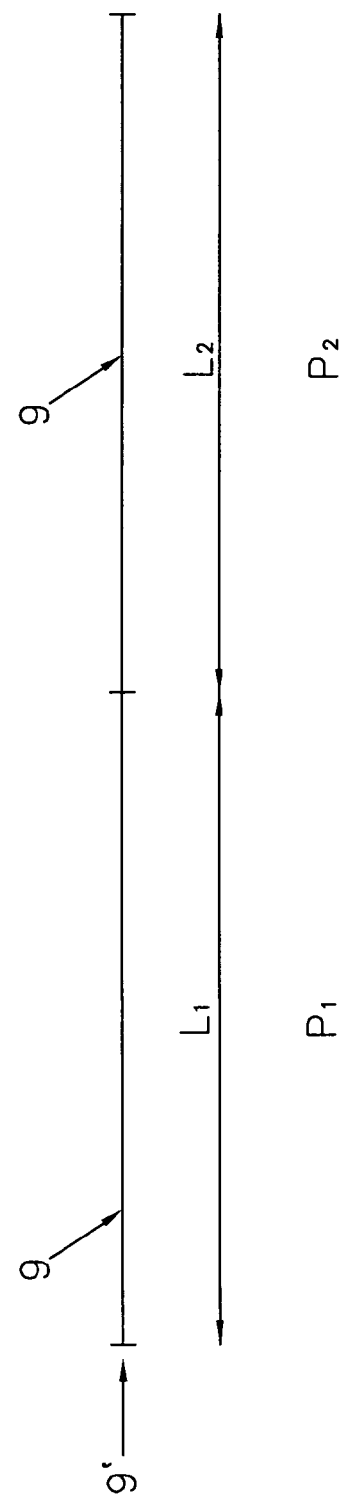
FIG. 3 shows a schematic illustration of two different interconnected welding wires.

FIG. 3 shows a schematic illustration of a welding wire 9' formed by two different interconnected welding wires 9. In this example, a welding wire 9' formed by two different welding wires 9, which is arranged on the wire coil 10 or the like, is used for welding a workpiece 14. The lengths $L_1$ and $L_2$ of the different interconnected welding wires 9 forming the welding wire 9' are adapted to the geometry of the workpiece 14 to be welded. When welding a rail, for example, length $L_1$ of the first welding wire 9 may correspond to the length required for welding the rail base. Length $L_2$ of the second welding wire 9 for welding the rail head corresponds to the length of the welding wire 9 required for welding the rail head according to experience. Of course multiple welding wires 9 with different materials and/or different diameters may be interconnected for forming the common welding wire 9' and arranged on the wire coil 10. Moreover, specific welding parameters $P_i$, which are to be used for welding the particular geometry of the workpiece 14, are stored for the particular welding wires 9 forming the welding wire 9'.

FIG. 4 shows an example of an indicator 26 in the region of the transition from one welding wire 9 forming the welding wire 9' to another welding wire 9 connected thereto. For example, the indicator 26, which is detected by an appropriate detector 27, may consist of a ring made of a reflecting material, a coloured ring or a ring made of a magnetic material. The detector 27 is formed in accordance with the design of the indicator 26, for example by an optical sensor, a magnetic sensor, a capacitive sensor, an inductive sensor or the like.

FIG. 5 shows a mark 28 in the region of the transition from one welding wire 9 forming the welding wire 9' to another welding wire 9 connected thereto. In the example illustrated, this mark 28 is formed by a ring-shaped notch formed in the region of the transition from one welding wire 9 forming the welding wire 9' to the other welding wire 9 connected thereto, and may be detected by an appropriate detector 27 such as an optical detector.

What is claimed is:

1. A method for performing a welding process on a workpiece by a welding torch, using a melting composite welding wire, the method comprising steps of:
   preassembling and interconnecting at least first and second welding wires in at least first and second lengths to form the composite welding wire, wherein the at least first and second welding wires have different material compositions or different diameters or different material compositions and different diameters and wherein the at least first and second lengths correspond to respective lengths of the composite welding wire used with respective different at least first and second welding parameters in the welding process,
   supplying the composite welding wire to the welding torch from a wire coil, and
   performing the welding process without interruptions using the different at least first and second welding parameters by supplying to the welding torch the composite welding wire from the wire coil.

2. The method according to claim 1, further comprising a step of:
   detecting a change of the interconnected at least first and second welding wires forming the composite welding wire during supply of the composite welding wire.

3. The method according to claim 2, further comprising a step of:
   displaying the change of the interconnected at least first and second welding wires forming the composite welding wire.

4. The method according to claim 2, wherein for the detecting an indicator arranged in the region of the transition from the first welding wire to the second welding wire connected thereto is detected.

5. The method according to claim 2, wherein for the detecting the at least first and second welding parameters are detected.

6. The method according to claim 2, further comprising a step of automatically changing the first welding parameters to the second welding parameters when the change of the interconnected first and second welding wires forming the composite welding wire is detected.

7. The method according to claim 1, further comprising a step of:
   communicating information about each of the at least first and second welding wires on the wire coil from an information carrier arranged on the wire coil to a control device of the welding device.

8. A welding device for performing a welding process on a workpiece at by a welding torch, using a melting composite welding wire, the welding device comprising:
   a welding torch,
   a wire coil,
   a hose package, and
   the composite welding wire, the composite welding wire being arranged on the wire coil and being suppliable to the welding torch via the hose package,
   wherein the composite welding wire is formed by preassembling and interconnecting at least first and second welding wires in at least first and second lengths and is arranged on the wire coil, wherein the at least first and second welding wires have different material compositions or different diameters or different material compositions and different diameters and wherein the at least first and second lengths correspond to respective lengths of the composite welding wire used with respective different at least first and second welding parameters in the welding process, so the welding process may be performed without interruptions using the different at least first and second welding parameters by supplying to the welding torch the composite welding wire from the wire coil.

9. The welding device according to claim 8, further comprising an indicator arranged in the region of the transition of the interconnected at least first and second welding wires forming the composite welding wire.

10. The welding device according to claim 8, further comprising a detector for detecting the change of the interconnected at least first and second welding wires forming the composite welding wire.

11. The welding device according to claim 10, wherein the detector is formed by an optical detector, a magnetic detector, or a device for detecting the parameters of the electric arc.

12. The welding device according to claim 8, further comprising:
   an information carrier arranged on the wire coil, the information carrier containing information about each of the at least first and second welding wires on the wire coil, and
   a reader configured to read the information carrier.

13. A wire coil comprising a composite welding wire for performing a welding process using a welding device, wherein the composite welding wire is formed by preassembling and interconnecting at least first and second welding wires in at least first and second lengths, wherein the at least first and second welding wires have different material compositions or different diameters or different material compositions and different diameters and wherein the at least first and second lengths correspond to respective lengths of the composite welding wire used with respective different at least first and second welding parameters in the welding process.

14. The wire coil according to claim 13, wherein the interconnected at least first and second welding wires forming the composite welding wire are welded together.

15. The wire coil according to claim 13, further comprising an indicator arranged in the region of the transition from the first welding wire forming the composite welding wire to the second welding wire connected thereto.

16. The wire coil according to claim 15, wherein the indicator comprises:
    a ring around one of the at least first and second welding wires forming the composite welding wire, the ring being made of a different material than the at least first and second welding wires, or
    a mark on one of the at least first and second welding wires forming the composite welding wire.

17. The wire coil according to claim 13, further comprising an information carrier containing information about each of the at least first a second welding wires.

* * * * *

UNITED STATES PATENT AND TRADEMARK OFFICE
CERTIFICATE OF CORRECTION

PATENT NO. : 9,545,683 B2
APPLICATION NO. : 14/483320
DATED : January 17, 2017
INVENTOR(S) : Ruehrnoessl et al.

It is certified that error appears in the above-identified patent and that said Letters Patent is hereby corrected as shown below:

In Column 8, Line 24, (Line 2 of Claim 8) after the word "workpiece" please delete: "at".

In Column 9, Line 28, (Line 3 of Claim 17) please change "a" to correctly read: -- and --.

Signed and Sealed this
Eleventh Day of April, 2017

Michelle K. Lee
*Director of the United States Patent and Trademark Office*